United States Patent [19]

Wells

[11] 3,967,890

[45] July 6, 1976

[54] CARRIAGE MECHANISM FOR MICROFICHE READER

[75] Inventor: Thomas R. Wells, Des Plaines, Ill.

[73] Assignee: Bell & Howell Company, Chicago, Ill.

[22] Filed: Dec. 16, 1974

[21] Appl. No.: 532,801

[52] U.S. Cl. .................... 353/27 A; 353/25; 33/1 M
[51] Int. Cl.² .................................... G03B 1/42
[58] Field of Search............ 353/27, 25, 26, 22–24, 353/122, 95, 96, 78; 33/1 M, 230; 16/148, 153, 160, DIG. 7, DIG. 17

[56] References Cited
UNITED STATES PATENTS
3,836,242  9/1974  Kluver et al. ..................... 353/27

*Primary Examiner*—Richard E. Aegerter
*Assistant Examiner*—Larry Jones
*Attorney, Agent, or Firm*—Robert A. Walsh

[57] ABSTRACT

A microfiche reader has a carrier which includes means for transporting a microfiche film with a rectilinear movement. The carrier has two plates of glass for receiving a microfiche between them. As the carrier moves to one extremity of its rectilinear movement, the cover glass automatically opens to enable manual access to the microfiche between the glass. At another extremity of its movement, the carrier moves one or more image lenses out of contact with the cover glass while precluding any chipping of the edge of the glass.

6 Claims, 5 Drawing Figures

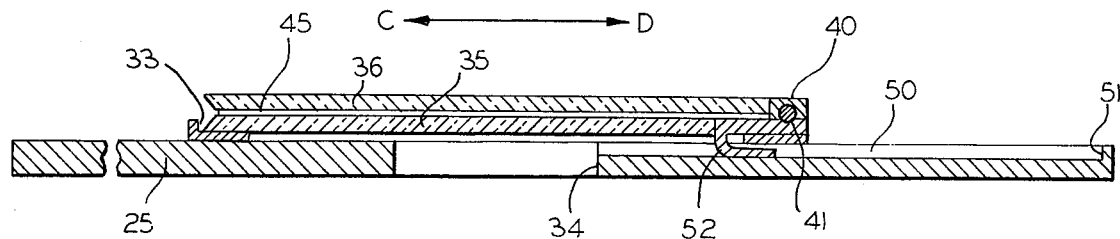
FIG.2
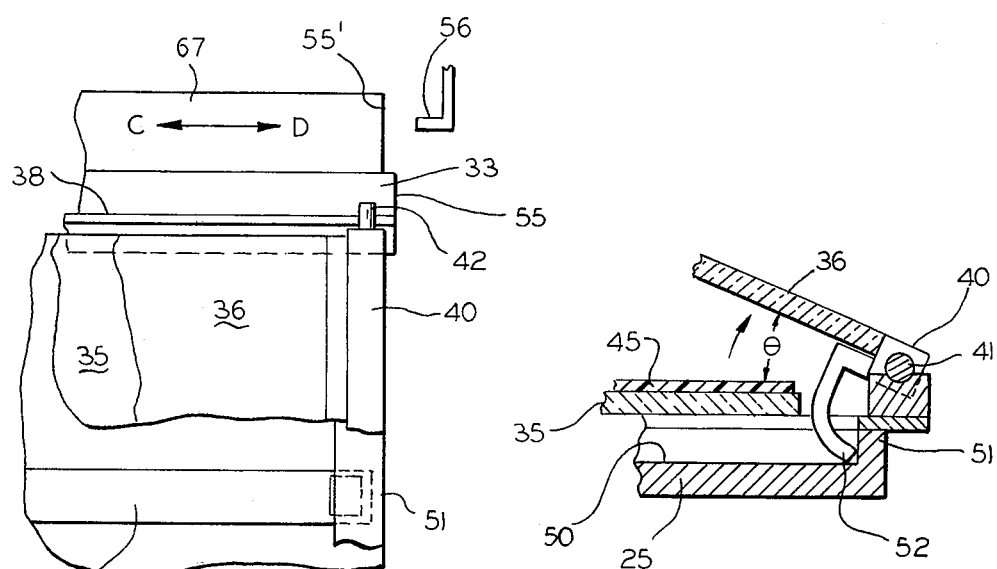
FIG.3
FIG.4
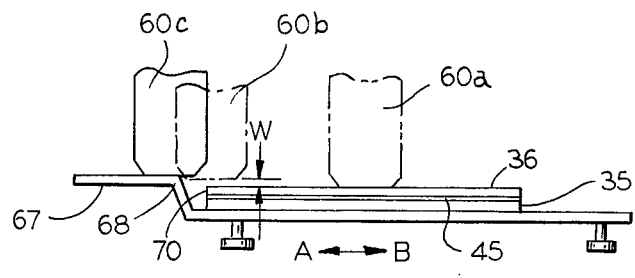
FIG.5

CARRIAGE MECHANISM FOR MICROFICHE READER

This invention relates to microfiche readers and more particularly to microfiche carriers for selecting and projecting photocopied images.

Microfiche film is a known form of graphic data presentation wherein a number of pages are photographically reproduced on a single "card" of microfiche film (such as a 3 inches × 5 inches to 4 inches × 6 inches, for example). Any suitable number (up to, say a thousand or so) of pages may be photographically formed in any orthogonal array on a single microfiche "card" of photographic film. The microfiche film may then be placed in a carrier of an optical reader. The carrier may be moved with a rectilinear motion until an image of a selected page is positioned in an optical projection path leading to a display screen.

Therefore, it should be apparent that a use of microfiche involves filing and storing in a library file, removal and mechanical manipulation of the microfiche, and then refiling in the library file. Each microfiche must be found in the library file with little or no search, and then returned to the same spot in the library file, for future reference. The mechanical manipulation of a microfiche involves sliding the microfiche into and out of the library file. Then, it must be placed in the carrier of the reader. Next, the carrier must be moved over a path in X and Y directions, until an image selected from the orthogonal array is in the optical path of a projector. While the microfiche is out of the library file and in the carrier, it should be possible to remove, replace, clean or adjust the microfiche. Thereafter, the microfiche carrier is moved from the reader and positioned to return the microfiche to the library file.

Human efforts lead to further problems. If manually kept, the microfiche library file is thumbed and soon becomes dog eared. Any grease on the fingers clouds the film and reduces the quality of the reproduced image. Human error may lead to misfiling and to an effective loss of the microfiche. The manipulation of the microfiche within the reader could cause scratches on the film.

To avoid these and other problems, it is possible to keep the microfiche library file in prepackaged cartridges so that only the cartridges need be touched by the human operator. The mechanical carrier in the microfiche reader equipment should be designed to extract the desired microfiche and, after use, to return it to its proper library file location within the cartridge.

Accordingly, an object of the invention is to provide new and improved microfiche carriers for use in photographic readers and especially—although not exclusively—to carriers for use in cartridge loaded readers. In greater detail, an object is to enable microfiche film to be manually reloaded, replaced or cleaned after it is extracted from a cartridge, while it is in the carrier, and before it is reloaded into a cartridge. Here an object is to provide a mechanical device for automatically opening and closing the carrier quickly and easily while it is in a reload position.

Yet another object of the invention is to provide a microfiche carrier for use in an automatic reader with a simple and obvious operation, which may be used by people who have no special training in the use of a microfiche reader. Here an object is to enable a casual patron of a public library, for example, to use the reader after only the simplest form of instructions.

In keeping with an aspect of the invention, these and other objects are accomplished by providing a microfiche carrier having mutually perpendicular tracks positioned to give the carrier a rectilinear movement while it is in a microfiche reader. The carrier has two spaced parallel plates of glass for receiving a microfiche film between them. As the carrier moves to one extremity of its rectilinear movement, the cover glass automatically opens to enable manual access to the microfiche between the glass. At another extremity of its rectilinear movement, an object lens is lifted off the cover glass without danger of chipping its edge.

The nature of a preferred embodiment of the invention may be understood best by a study of the attached drawing wherein:

FIG. 2 is a side elevation view in cross section (taken along line 2—2 of FIG. 1) and showing a mechanism for automatically raising or lowering the cover glass of the carrier depending upon whether or not the carrier is at one extremity of its rectilinear coverage motion;

FIG. 3 is a plan view of a fragment of a corner of the microfiche carrier, which shows an interlock mechanism that enables the automatically raised cover glass at the extremity of the rectilinear motion;

FIG. 4 is a stop motion schematic view of the cover glass lifting mechanism, as it operates at the extremity of the microfiche carrier movement; and FIG. 5 is a schematic diagram showing how the cover glass of the carrier may be removed from under an image forming lens holder without danger of chipping the edge of the cover glass.

Figure 1:
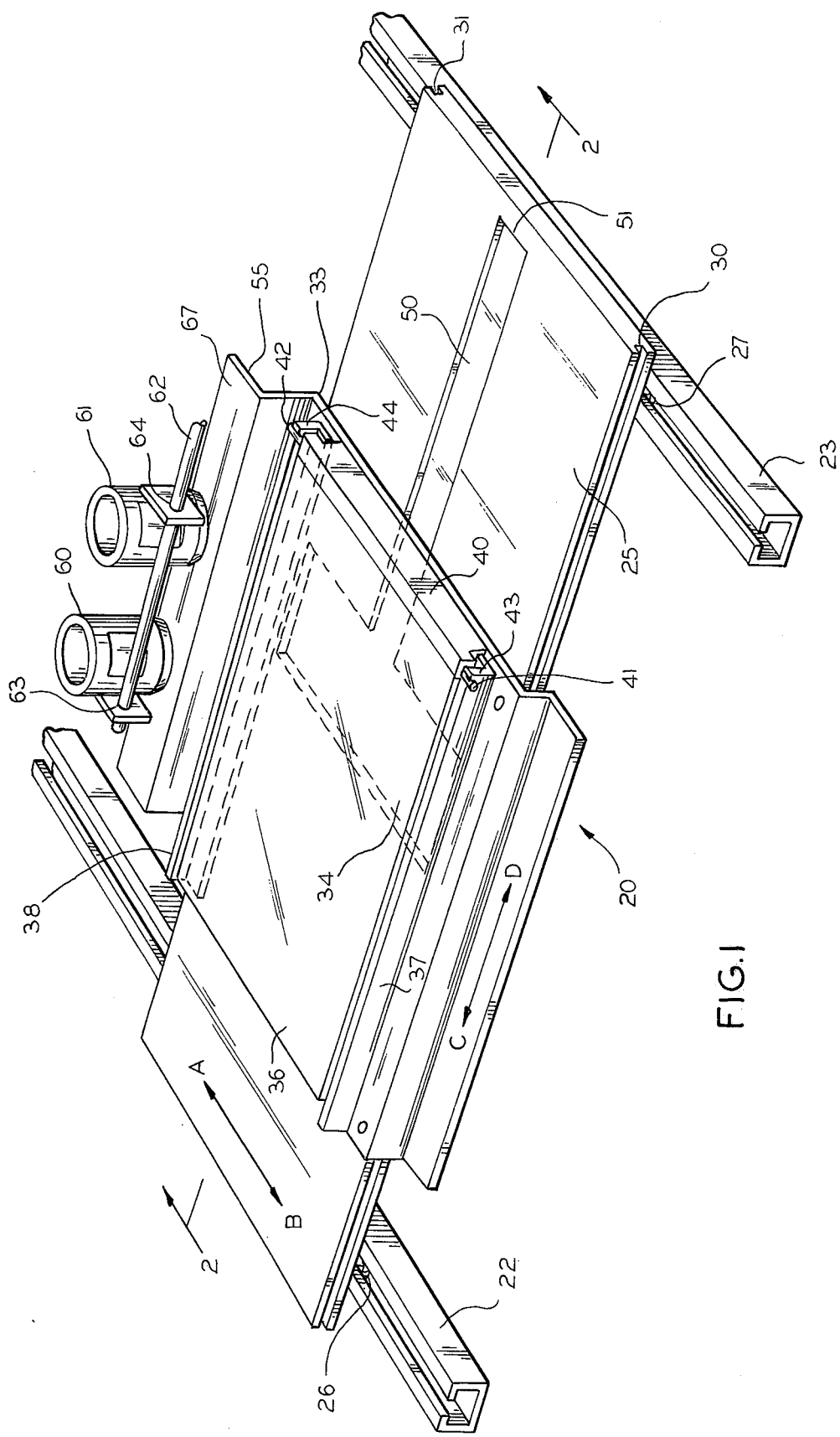
FIG. 1 is a perspective view of a microfiche carrier arranged for rectilinear motion and a pair of image lens mounts in a position which is removed from the cover glass of the carrier.

The inventive microfiche carrier 20 (FIG. 1) may be mounted on a spaced parallel pair of guide rails 22, 23 extended transversely across the top of a base unit forming part of a microfiche reader (not shown). A rectangular lower carrier 25 has four wheels (two of which are numbered 26, 27) which roll in the tracks 22, 23. Hence, lower carrier 25 may be manually pushed back and forth in directions A and B. The lower carriage 25 includes a second spaced parallel pair of tracks 30, 31, which are perpendicular to tracks 22, 23. A rectangular upper carrier 33 rolls back and forth in directions C and D on wheels (not shown) rolling in tracks 30, 31. The lower carrier 25 contains a cut out portion 34 which enables passage of a light beam for projecting a microfiche image. Accordingly, it should now be apparent that the upper carrier 33 may be moved to almost any spot, in rectilinear or X and Y directions, which is within the movement provided by the tracks 22, 23, 30, 31.

A pair of glass plates 35, 36 are mounted on the upper carrier 33. In greater detail, the lower glass plate 35 lies between spaced parallel side rails 37, 38 on the top of the upper carrier 33. Upper plate 36 is cemented to a hinge member 40 having opposed pins 41, 42 which rest in bearings 43, 44 formed in the side rails 37, 38. Hence, the upper glass plate may be lifted and a microfiche 45 (FIG. 2) may be placed between it and the lower glass plate. It should now be apparent how the microfiche image is placed between the two glass plates 35, 36 and moved to any desired position defined by the rectilinear tracks 22, 23, 30, 31.

Means are provided for opening the glass plates at one extremity of carriage motion. More particularly, the lower carriage 25 (FIG. 2) includes a fairly thick plate having a slot 50 milled therein, extending almost to the end thereof, where the slot stops at an upstanding wall 51. Upon inspection of FIG. 2, it will be seen that a hook 52 is dependent from and integral with the hinge member 40. The depth of slot 50 is such that this hook normally clears the bottom of the slot 50 as the carrier moves back and forth in directions C, D.

From an inspection of FIGS. 3, 4, the upper carrier 33 is able to move in direction D until an edge 55 strikes a portion 56 of the microfiche reader housing. At this point in the rightward movement of carrier 33, hook 52 remains in slot 50 and has not yet contacted upstanding wall 51. As will be explained, this interlock structure prevents upper glass plate 36 from pivoting upward while carrier 33 remains beneath lenses 60, 61, or any part of housing 56.

By moving carrier 33 forward, as viewed in FIG. 3, edge 55 becomes free of housing portion 56, which now engages indented edge 55' of the carrier, enabling the carrier to move slightly further to the right. Upon continued movement in direction D, hook 52 engages the upstanding wall 51 at the end of slot 50. This raises the upper glass 36 through an angle $\theta$ (FIG. 4) which is far enough to enable the removal and replacement of the microfiche 45 between the glass plates.

When the upper carrier 33 is again moved in direction C, the hook 52 moves away from the wall 51 and the glass 36 is automatically lowered.

It is important that the upper carrier should provide means for insuring a proper focus despite loose manufacturing tolerances. Briefly, all mechanical parts are certain to have some manufacturing tolerances. The looser the tolerances, the lower the cost. Therefore, it is desirable for the image lenses (which rest in lens carriers 60, 61—FIG. 1) to have a focal length which is independent of these tolerances. A moments reflection makes it clear that the image lens carriers 60, 61 will insure such a focus if they ride freely upon the top of the cover glass plate. The sides of the glass are exactly parallel. The thickness of the glass is dependably accurate. The microfiche 45 is held firmly against the underside of the glass 36. Hence, the image lenses in lens carriers 60, 61 and the microfiche always have the same spacial relationship if the lens carriers merely float on the top of the glass 36.

For the foregoing reasons, the lens mounts preferably sit loosely in sockets on a suitable housing support (not shown). A focusing rod 62 is supported by bearings 63, 64 in plates which are integral with the loose lens mounts. This rod 62 is free from any rigid alignment with the reader housing which allows the focusing rod 62 to tip to any position fixed by the bearings and therefore to be parallel with the top surface of the cover glass 36. The bottom (FIG. 5) of the lens mounts (e.g., 60) is rounded or otherwise shaped to enable the lens to glide smoothly over the upper surface of cover glass 36, as the carrier is moved to locate the microfiche image in the optical path.

Accordingly, a shelf 67 (such as stainless steel) is formed on the back of the upper carrier 33 to receive and support the lens mounts 60, 61 when the carrier is moved the maximum allowable distance in direction B. More specifically, at the position 60a, the lens mounts 60, 61 rest upon and slide over the surface of glass plate 36 as it is moved to locate a microfiche image. As the carrier 33 is pulled in direction B, the lens mount engages the shelf point 68. The edges between the shelf 67 and the lens mount at 68 are in the shape of mutually inclined planes. Thus, the lens mount is lifted to the position 60b before it passes completely off the edge of glass 36. Finally, the carrier reaches the outward extremity of its movement in direction B and the lens mount is resting upon the stainless steel shelf 67. The microfiche carrier glass plate 36 may now be lifted in any suitable manner. The microfiche may be removed, cleaned, replaced or otherwise adjusted. Then, the carrier 33 is pushed back in direction A and the lens mount 60 returns over the path indicated by the three stop motion positions 60a, 60b, 60c.

It should be noted that as the lens mount 60 crosses the edge 70 of the glass plate 36, it is lifted, by the distance W, away from the glass surface. Hence, the edge of the glass is never touched by the sliding lens mount.

Those who are skilled in the art will readily perceive how various modifications may be made within the scope and the spirit of the invention. Therefore, the appended claims are to be construed to cover all equivalent structures.

I claim:

1. A microfiche film holding device comprising means for enabling said device to travel over a mutually perpendicular set of rails with a rectilinear movement, a pair of spaced parallel glass plates mounted on said device to travel with said device over said rectilinear movement means on said device for automatically lifting one of said glass plates when said device is moved to one extremity of said rectilinear movement, said device including an upper generally rectangular carrier mounted on a generally rectangular lower carrier, each of said rectangular carriers having wheels on the corners thereof engaging said rails, one set of said rails being mounted on a microfiche reader, the other of said set of rails being mounted on said lower carrier, said automatic lifting means including a dependent hook means on said upper carrier, and said lower carrier including a slot terminating in an upstanding wall for engaging said hook, said engagement of said hook and said upstanding wall lifting said one glass plate.

2. The holding device of claim 1 and a hinge affixed to the upper most one of said pair of glass plates, said hook being integrally movable with said hinge, said slot having a depth which receives said hook so that it may move therein without effect upon said hinge, said hook being shaped and positioned to engage said upstanding wall at the end of said slot whereby said hook moves through said slot, engages said wall and articulates said hinge.

3. The device of claim 2 wherein at least one floating lens mount attached to said microfiche reader slides over the surface of said upper glass plate, whereby the optical relationship between a microfiche located between said pair of glass plates and a lens in said mount is established by the thickness of said glass plates and the mutual parallelism of the two sides of said upper glass plate, and an elevated shelf means formed on said upper carrier adjacent one of said glass plates; the surface of engagement between said floating lens mount and said shelf being a pair of mutually inclined planes whereby said lens mount is lifted from the upper surface of one of said glass plates and onto said shelf, responsive to movement of said carrier.

4. The device of claim 3, wherein said shelf includes an edge near an extremity of the upper carrier motion where said hook engages said upstanding wall terminating said slot and a housing portion near said extremity of upper carrier movement, said edge and said housing portion forming a mechanical interlock for limiting upper carrier movement and movement of said upper plate.

5. A microfiche film holding device comprising a mutually perpendicular set of rails, an upper carrier and a lower carrier each having wheels thereon engaging said rails enabling said carriers to travel with rectilinear movement, a pair of spaced parallel glass plates mounted on said upper carrier to travel with said carriers over said rectilinear movement, means on said carriers for automatically lifting one of said glass plates when said carriers are moved to one extremity of said rectilinear movement, said automatic lifting means including dependent hook means on said upper carrier, and said lower carrier including an upstanding means for engaging said hook, said engagement of said hook and said upstanding means lifting said glass.

6. A microfiche film holding device comprising an upper and lower carrier means for enabling said carriers to travel over a mutually perpendicular set of rails with a rectilinear movement, a pair of spaced parallel glass plates mounted on said upper carrier, means on said carriers for automatically lifting one of said glass plates when the upper carrier is moved to one extremity of said rectilinear movement wherein said automatic lifting means includes a hook which is attached to a hinge between one of said glass plates and said upper carrier and a slot in said lower carrier with an upstanding wall at the end of said slot whereby said hook moves through said slot, engages said wall and articulates said hinge.

* * * * *